(No Model.) 2 Sheets—Sheet 2.
J. W. WADE.
COMBINED HOG TRAP AND CRATE.
No. 444,117. Patented Jan. 6, 1891.
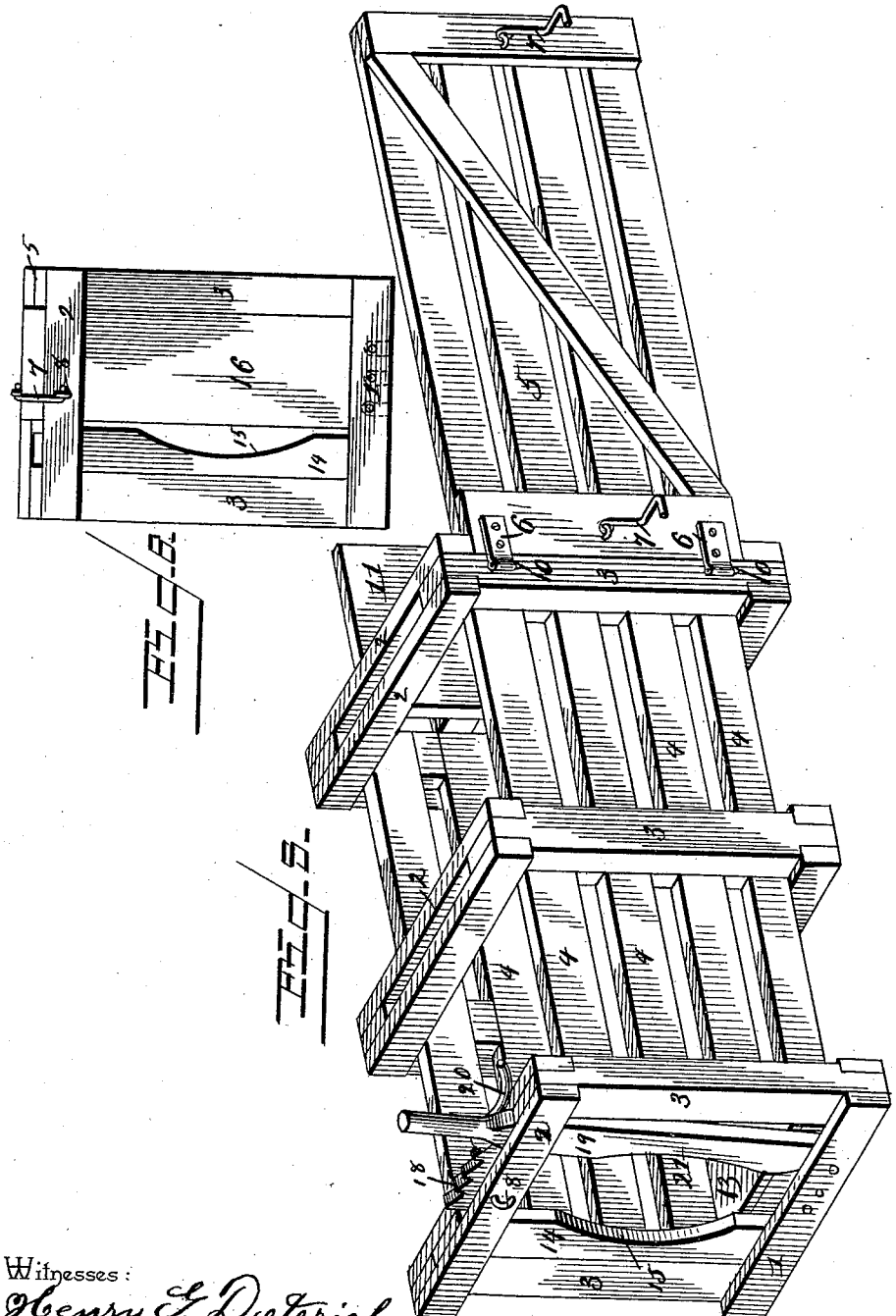
Witnesses:
Henry F. Dieterich
W. S. Duvall
Inventor
John W. Wade
By his Attorneys,
C. A. Snow & Co.

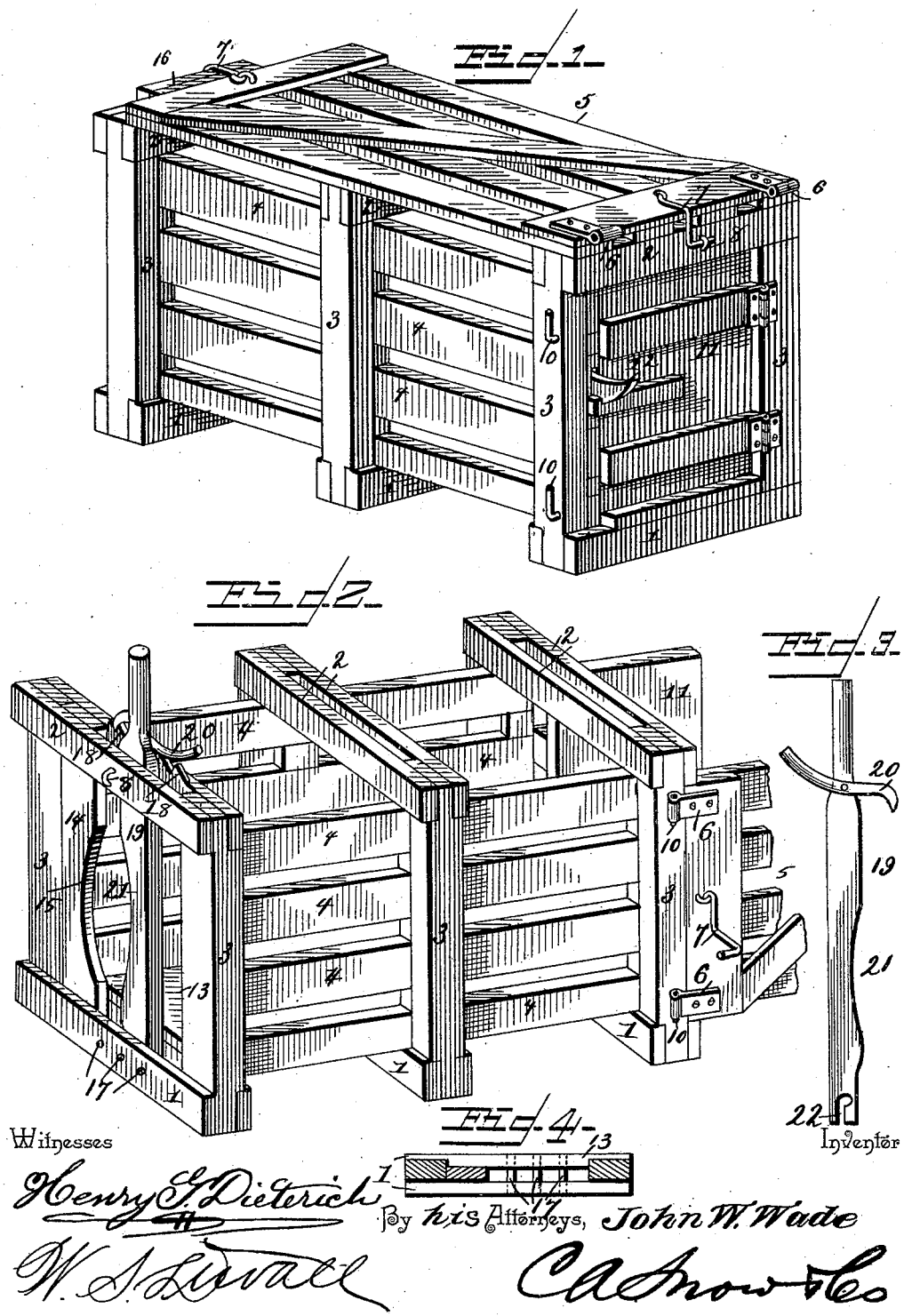

UNITED STATES PATENT OFFICE.

JOHN W. WADE, OF LAMOILLE, ILLINOIS.

COMBINED HOG TRAP AND CRATE.

SPECIFICATION forming part of Letters Patent No. 444,117, dated January 6, 1891.

Application filed August 2, 1890. Serial No. 360,768. (No model.)

*To all whom it may concern:*

Be it known that I, JOHN W. WADE, a citizen of the United States, residing at Lamoille, in the county of Bureau and State of Illinois, have invented a new and useful Combined Hog Trap and Crate, of which the following is a specification.

This invention has relation to combined hog traps and crates.

The objects of the invention are to provide a trap of cheap and simple construction into which the hog may be readily guided for the purpose of branding, ringing, &c., to adapt the trap for successfully holding the hog, and to so construct the same as to be designed for use as a crate by which such animals as calves and the like may be transported.

With the above objects in view the invention consists in certain features of construction hereinafter specified, and particularly pointed out in the claims.

Referring to the drawings, Figure 1 is a perspective of a stock-trap constructed in accordance with my invention, the same being closed and adapted for use as a transporting-crate. Fig. 2 is a similar view, the same being adapted for the holding of hogs. Fig. 3 is a detail in side elevation of the hog-holding lever. Fig. 4 is a detail in plan of the front sill, the uprights or posts being shown in transverse section. Fig. 5 is a view in perspective showing the top removed and attached to the side when used to direct the cattle into the trap. Fig. 6 is a front elevation, the trap being adapted to serve as a crate.

Like numerals of reference indicate like parts in all the figures of the drawings.

In practicing my invention I employ a series of transverse lower sills 1, each of said sills being formed of opposite sections, and also a series of upper transverse sills 2, which, like the lower sills, are formed of sections. The series of sills are connected by opposite vertical posts or uprights 3, tenoned at their ends and embraced by the ends of the sills. These posts are connected by longitudinal side bars 4 and the usual bottom, which rests upon the sills. The upper series of sills are connected by a gate 5, which forms a top for the device, and said gate is provided at one end with a pair of hinge sections or members 6. The gate is held in removable position upon the upper sills by L-shaped hooks 7, the free ends of which engage eyes 8, which project from the outer sides of the two upper end sills. One of the rear posts is provided with a pair of laterally-disposed hooks 10, and over the same are adapted to take the hinge members 6, whereby said gate may form a continuation of one of the side walls of the trap and aid in guiding hogs to the rear end of the trap, which latter is provided at its rear end at the sides opposite to that at which are located the hooks 10 with a hinged door 11, locked by a latch 12. The front end of the structure is provided with an opening 13, through which the hogs may make their exit after having been ringed, and within the opening is fixed a vertical post 14, the inner edge of which is provided with a curved recess 15.

16 designates a sliding door, which is inserted between the upper and lower sill sections at the front end of the structure. This door is removable and is normally maintained in position by means of one of the L-shaped hooks 7, which passes over the upper end of the same and when in position adapts the trap at its front end to serve as a crate.

The two sill-sections composing the front lower sill are connected by a series of transverse pins 17, as shown, and the rear section of the upper front sill is provided with a ratchet-bar 18.

19 designates a lever adapted to be inserted between the two sections of the upper and lower front series, and above the upper sill said lever is reduced to form a handle and provided with a gravity locking-pawl 20. The inner edge of the lever is cut away or curved, as at 21, opposite the curved or cut-away portion 15, and the lower end of the lever is provided with an inverted-L-shaped or bayonet slot 22. The lever may be moved along so that the slot 22 receives any one of the pins 17, so that the space between the lever and the vertical bar 15 may be increased or diminished.

In branding or ringing hogs the lever is first set to about the position adapted to permit of the insertion of the head of the hog, and the hog is driven through the rear door, and as he attempts to pass out the front door the lever 21 is swung toward the bar 14, thus closely gripping the hog around the neck. The pawl 20 locks in engagement with the teeth of the rack-bar, so that the lever is locked in position and cannot be relaxed by the struggles of the hog. After the hog has passed out, if it is desired to remove the lever to convert the trap into a crate, the upper end of the lever is drawn to the rear, the pawl acting as a fulcrum, so that the pin 17, which engages the slot 22, registers with the vertical portion of the slot and the lever may be withdrawn.

Having thus described my invention, what I claim is—

1. In a hog-trap, the combination, with the frame provided at one side of its rear end with a hinged door and at its opposite side with hinge members, of a top mounted removably upon the frame and provided at one end with hinge members adapted to engage with the hinge members of the frame and to combine with the rear door of the frame to form a passage, substantially as specified.

2. In a hog-trap, the combination, with the vertically-sliding door 16 and its opposite guides and with the removable roof overlapping the said guides, of an L-shaped hook pivoted to the roof of the trap and extending over the upper end of the door, and a staple mounted on the front of the trap, adapted to engage the free end of said hook, substantially as specified.

3. A combined hog trap and crate having a removable top, means for securing the top in place, and means for hinging the top to the side of the trap, so as to be used to direct cattle into the trap, substantially as specified.

In testimony that I claim the foregoing as my own I have hereto affixed my signature in presence of two witnesses.

JOHN W. WADE.

Witnesses:
JOHN MALOY,
JAMES KNIGHT.